United States Patent [19]

Escamilla

[11] Patent Number: 4,751,876
[45] Date of Patent: Jun. 21, 1988

[54] METHOD AND APPARATUS FOR BAKING THIN DOUGH DISCS

[75] Inventor: Robert M. Escamilla, San Antonio, Tex.

[73] Assignee: Bakery Equipment and Service Co., Inc., San Antonio, Tex.

[21] Appl. No.: 885,418

[22] Filed: Jul. 14, 1986

[51] Int. Cl.⁴ .............................................. A47J 37/00
[52] U.S. Cl. ........................................ 99/353; 99/395; 99/423; 99/443 C; 99/448; 198/406; 426/512
[58] Field of Search ............ 99/353, 395, 423, 443 C, 99/443 R, 448; 426/496, 512, 523; 432/142; 198/406, 407, 410, 603

[56] References Cited

U.S. PATENT DOCUMENTS

| | | | |
|---|---|---|---|
| 2,591,971 | 4/1952 | Skillman | 198/603 X |
| 2,830,529 | 4/1958 | Jaffe | 99/423 |
| 3,215,062 | 11/1965 | Frankenberg | 99/353 |
| 3,286,362 | 11/1966 | Bolt | 198/603 X |
| 3,478,704 | 11/1969 | Ford | 198/603 X |
| 3,683,150 | 8/1972 | Kehl et al. | 99/423 X |
| 4,508,025 | 4/1985 | Schultz | 99/353 |
| 4,569,851 | 2/1986 | Schultz | 426/496 |
| 4,683,813 | 8/1987 | Schultz | 99/353 |

*Primary Examiner*—James Kee Chi
*Attorney, Agent, or Firm*—Norvell & Associates

[57] ABSTRACT

A baking oven embodying the method of this invention comprises a plurality of vertically stacked, vertically spaced heated baking plates. Every other one of the baking plates is periodically shifted from a horizontal baking position to an inclined discharge position wherein the disc of dough slides off the respective baking plate and falls toward the next lower baking plate. During its fall, the dough disc is engaged by an inverting apparatus which deposits it on the next lower baking plate in inverted relationship, so that both sides of the dough disc are successively exposed to the heat of the baking plate as the disc traverses downwardly through the stack of plates.

7 Claims, 4 Drawing Sheets

METHOD AND APPARATUS FOR BAKING THIN DOUGH DISCS

BACKGROUND OF THE INVENTION

1. Field of the Invention

This invention relates to a method and apparatus for baking thin discs of dough to form tortillas, taco shells, or the like, and particularly to a method and apparatus for sequentially baking dough discs at a high volume rate.

2. History of the Prior Art

Baked dough products in the form of flat discs have long been utilized for the manufacture of tortillas, taco shells, pita bread, and the like. The fast food restaurant industry has recently been attracted to the baking of tortillas and taco shells in response to a customer order, rather than relying upon conventional oven baking of a large number of such items which are prone to be cold or stale when delivered to the customer. Additionally, the space available in a modern fast food restaurant is extremely limited, yet the oven must be sufficiently large to bake a substantial number of flat dough discs at a time in order to meet the demands, particularly during rush periods.

There is a definitive need, therefore, for a small, compact baking apparatus for flat dough disc products that can produce such products sequentially at a relatively fast production rate, yet which will require much less floor space than any conventional oven capable of producing the same number of baked products in the same period of time.

A prior art attempt to resolve this problem is disclosed in U.S. Pat. No. 4,508,025 to SCHULTZ. In the SCHULTZ apparatus, the flat dough discs are sequentially transferred from one to another of a vertical stack of rotating heated oven plates but, since each of the heated rotating oven plates can only accommodate a single dough disc at a time, much of the oven space is wasted.

SUMMARY OF THE INVENTION

This invention contemplates the baking of flat discs of dough by the sequential transfer of the dough disc from the top to the bottom of a vertical stack of vertically spaced, heated baking plates. Each of the baking plates is mounted for pivotal movement about a horizontal axis and can be shifted from a horizontal baking position to a horizontally inclined discharge position. The angle of inclination is selectd to be sufficient to insure the gravity discharge of the dough disc from each baking plate as it approaches its inclined discharge position. The dough disc is engaged while it is falling from one baking plate to the next lower baking plate by an inverting guide plate which effects the deposit of the falling dough disc onto the next lower baking plate in an inverted position with respect to that which it had while it was being baked on the next upper baking plate.

While each baking plate may be individually controlled to shift from its baking position to its discharge position, in the preferred embodiment of this invention every other one of the baking plates is operatively connected to a common pivoting mechanism so as to simultaneously pivot from a baking position to an inclined discharge position, and then simultaneously return to the horizontal baking position. The remaining baking plates are similarly operatively connected to a second pivoting mechanism for effecting their shifting from the horizontal baking position to an inclined discharge position, and then shifting back to the horizontal baking position. The two actuating mechanisms are interrelated so that the movements of the two sets of baking plates is synchronized, but is in 180° phased displaced relationship, i.e., when the one set of baking plates are in the horizontal baking position, the other set of baking plates are in an inclined discharge position. In this manner, a dough disc deposited on the uppermost baking plate will sequentially progress through the vertical stack of baking plates to the lowermost baking plate from which it can be discharged onto a suitable conveyor or stationary plate. At each transfer from one baking plate to the next lower baking plate the disc is inverted so that both sides of the disc are sucessively subjected to direct contact with the baking plate, thus assuring the rapid and yet uniform baking of the disc as it traverses through the stack of baking plates.

To facilitate the discharge of the dough disc from each heated baking plate, such plate is preferably provided with a surface coating of any well known nonstick organic compound, such as tetrafluorethylene. Additionally, the actuating mechanism is preferably designed to come to an abrupt halt as it pivots to the horizontally inclined discharge position, thus imparting an inertia force to the dough disc contained on the baking plate reaching the discharge position. Such inertia force provides a substantial assistance to gravity in dislodging the dough disc from the particular baking plate.

The baking plates are preferably enclosed by heat insulated panels to maintain a heated environment around the baking plates.

Further objects and advantages of this invention will be readily apparent to those skilled in the art from the following detailed description, taken in conjunction with the annexed sheets of drawings, on which is shown a Preferred Embodiment.

DESCRIPTION OF PREFERRED EMBODIMENT

Figure 1:
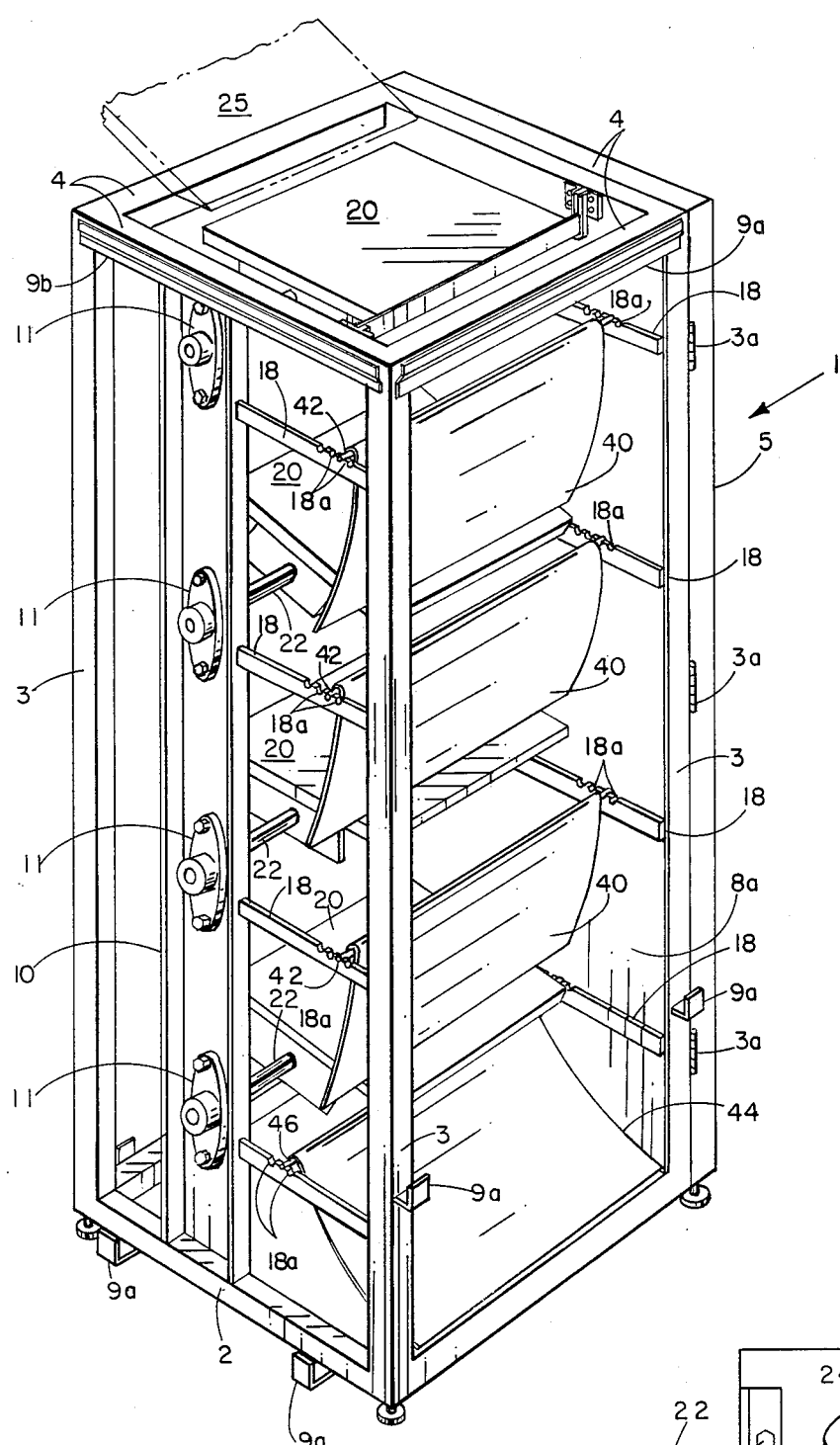
FIG. 1 is a perspective view of a flat dough disc baking oven embodying this invention with the side panels removed.

Referring to the drawings, the oven 1 embodying this invention comprises a cabinet structure defined by a generally rectangular base frame 2 having upstanding corner frame elements 3 disposed at each of its four corners. The upper ends of the vertical frame members 3 are secured together by top frame elements 4. All such frame elements comprise channel or angle iron and are secured together by welding.

Figure 2:
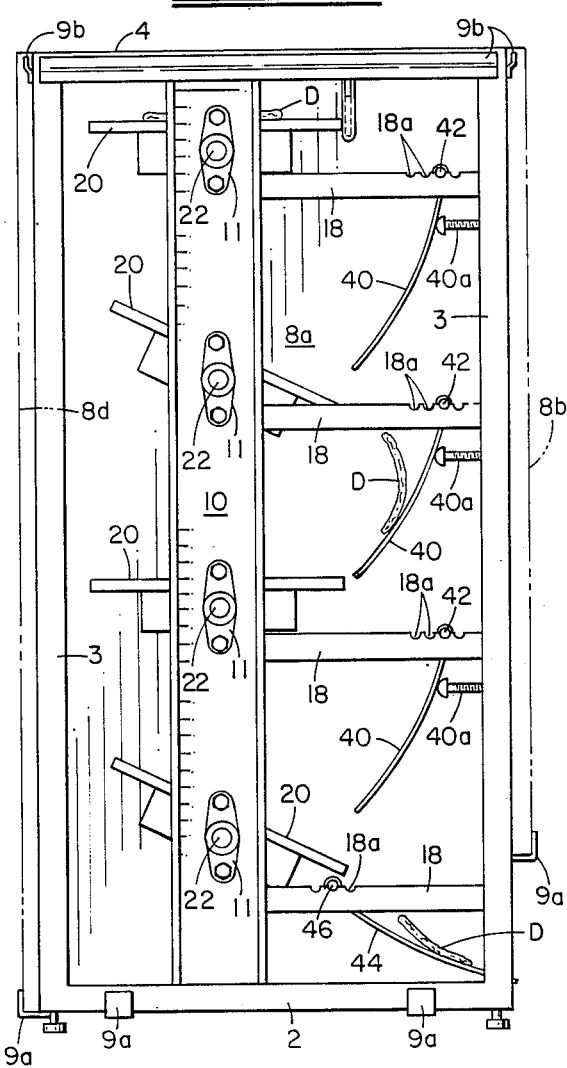
FIG. 2 is a side elevational view of the baking oven of FIG. 1, with a side panel removed.
Figure 3:
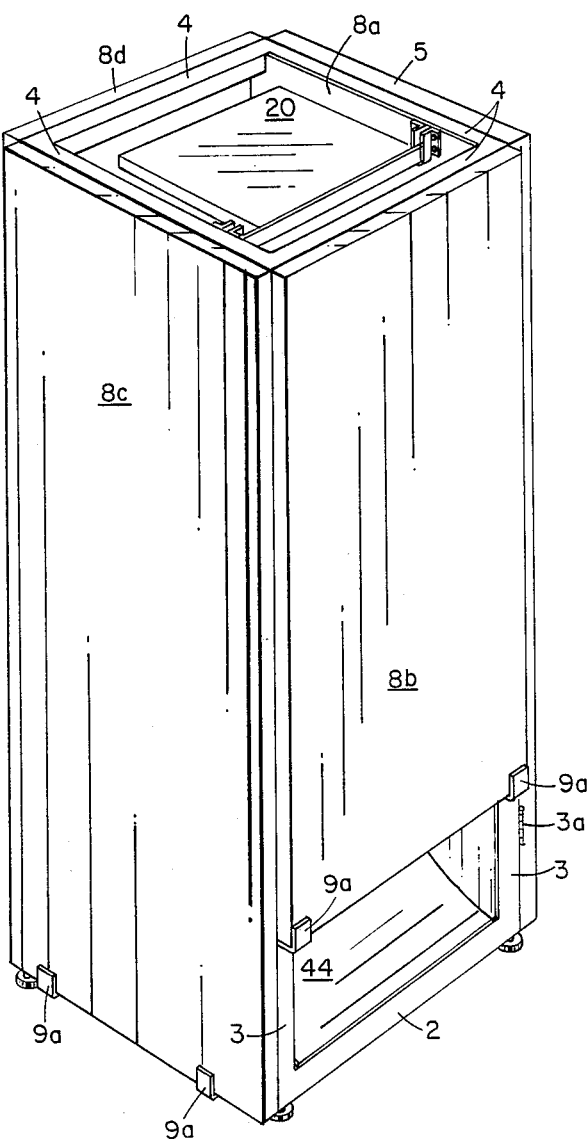
FIG. 3 is a perspective view of the baking apparatus of FIG. 1, with the side panels applied.

Along the right hand front vertical frame element 3, as viewed in FIG. 1, a plurality of vertically spaced hinges 3a are secured for pivotally mounting a door 5 (FIG. 5) carrying a fan 6 and control circuit elements 7 for the oven. On the side of the oven adjacent the door 5, a structural panel 8a is rigidly secured to the frame elements. The remaining side walls of the oven 1 are preferably enclosed by detachable laminated insulated metal panels 8b, 8c and 8d. The panel 8b mounted on the front side of the oven 1 does not extend all the way to the bottom of the upstanding frame elements 3, but as shown in FIG. 2, terminates above base frame 2 to provide a discharge opening for the finished baked products to be discharged from the oven. All such panels are detachably mounted on bottom brackets 9a and top suspension bars 9b.

Along the one side of the oven frame, a vertically extending bearing frame member 10 is suitably mounted, extending between the base frame 2 and the top frame element 4. Such bearing support member 10 is provided with a plurality of vertically spaced bearing elements 11. Identical bearing elements 11 are mounted on the exterior of structural panel 8a in coaxial alignment with the bearing elements 11 mounted on bearing support member 10 for effecting the pivotal mounting of a baking plate 20 between each of the sets of two coaxially aligned bearings 11. Of course, panel 8a and support member 10 are apertured (not shown) in alignment with the respective bearings 11 mounted thereon.

Figure 6:
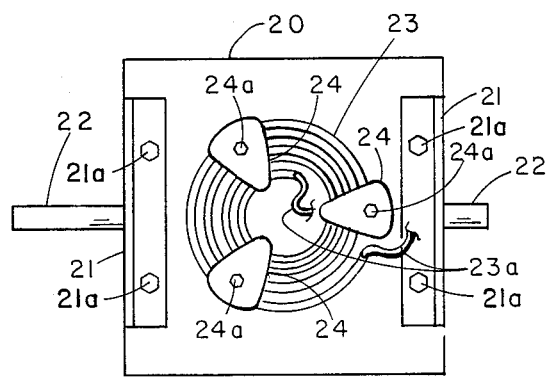
FIG. 6 is a bottom elevational view of one of the baking plates showing the mounting of the heating element thereon.
Figure 4:
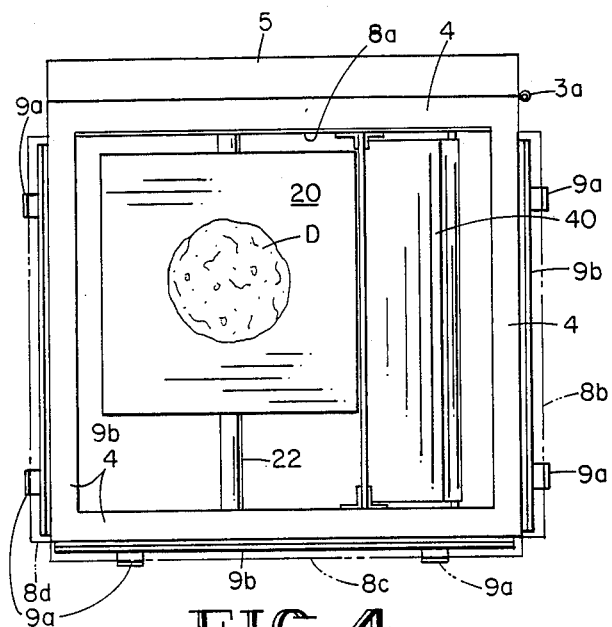
FIG. 4 is a top elevational view of the baking apparatus of FIG. 1.

Referring particularly to FIG. 6, it will be seen that each baking plate 20 is provided with brackets 21 secured by bolts 21a on opposed edges of its underside to each of which a tubular shaft 22 is suitably secured. Tubular shafts 22 are journalled in the vertically spaced bearings 11, thus resulting in a plurality of axially stacked, axially separated baking plates respectively capable of pivotal movement about vertically spaced horizontal axes.

A heating element 23 is secured to the underside of each baking plate 20 by bracket plates 24 and bolts 24a. Heating element 23 is supplied with electrical current by a a pair of conductors 23a which pass through the bore in one of the hollow shafts 22 for connection with the control circuit elements 7 in a manner that will be later described. Thus, each baking plate 20 may be heated to a predetermined temperature through the application of an appropriate electric current to its heating coil 23.

Figure 5:
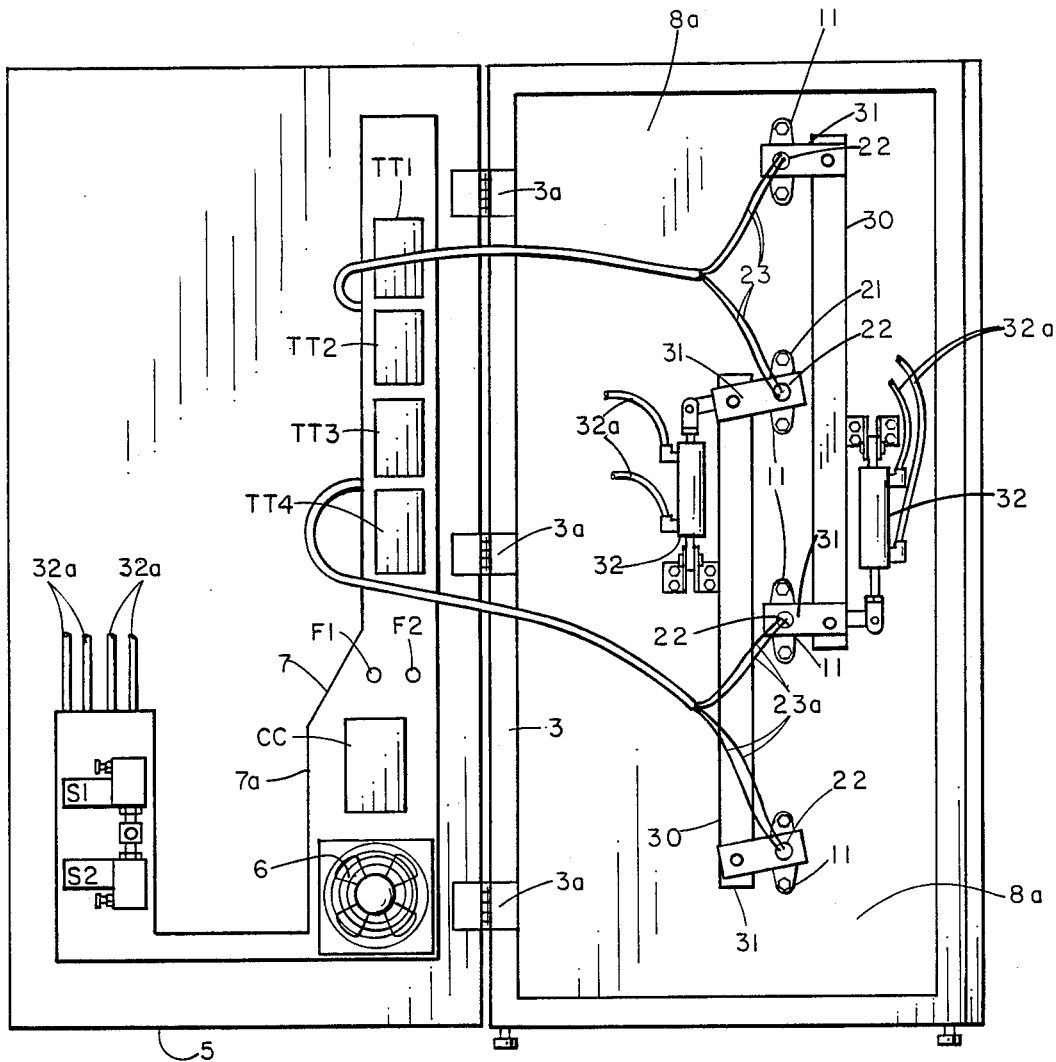
FIG. 5 is a side elevational view of the baking apparatus of FIG. 1 with the side door swung open to reveal the actuating mechanism for pivoting the baking plates.

Referring now to FIG. 5, every other one of the baking plates 20 is simultaneously actuated to shift from a horizontal baking position to an inclined discharge position by a connecting link 30 which is pivoted at each end to a crank 31 rigidly secured to the bearing sleeves 22 of the particular baking plates 20. An identical actuating mechanism is provided for the remaining baking plates and is identified by the same numerals. Each connecting link 30 is shifted vertically between two positions, respectively corresponding to the horizontal baking position of the baking plates to which it is operatively connected and an inclined discharge position of such baking plates, by a fluid pressure cylinder 32 which is pivotally secured at one end to panel 8a. Those skilled in the art will appreciate that an electric solenoid could be employed instead of the fluid pressure cylinder, if desired, but fluid pressure actuation is accomplished more rapidly and with a more abrupt stoppage at the end of the power stroke, which is advantageously utilized in the operation of this oven, as will be explained. Conduits 32a from each cylinder 32 extend to the control panel elements carried on the pivoted door 5.

In accordance with this invention, the cylinders 32 are activated in a 180° phase displaced relationship, i.e., when the one cylinder 32 is activated to shift one set of baking plates from a horizontal to a vertical position, the other cylinder 32 will not be activated. When the first mentioned cylinder 32 is deactivated and returned to its original position by a spring, (not shown) thus returning the connected baking plates to their horizontal baking position, then the other cylinder 32 will be activated to shift the other set of baking plates to their discharge position. Of course, the dwell time between the successive operations of the cylinders 32 is selected to provide the desired amount of baking time on each of the baking plates.

A flat disc of dough D is applied to the upper baking plate 20 when such plate is in its horizontal baking position. The dough disc D may be applied by hand or may be fed into the machine from a press (not shown) by sliding down a suitable conveyor tray 25. After the desired length of residence time of the disc on the uppermost baking plate 20, the cylinder 32 to which such baking plate is operatively connected is activated to pivot the top plate and all of the baking plates connected thereto for simultaneous pivotal movement to a inclined discharge position, and the partially baked disc of dough D slides off the edge of the uppermost baking plate and falls toward the next lower plate which is in a horizontal position.

An inverting apparatus is disposed laterally adjacent the discharge edge of each baking plate 20 and preferably comprises a slightly arcuate sheet of metal 40. The top edge of each metal sheet 40 is wrapped around a pivot rod 42 which is selectively engaged in one of a plurality of notches 18a provided in transverse horizontal frame members 18 which respectively extend between the vertical bearing support 10, or structural panel 8a, and the adjacent vertical corner frame element 3. It will therefore be apparent that as a dough disc slides off a baking plate which is in its inclined discharge position, the leading edge of the dough disc will contact the inverting sheet 40 and will be caused by such sheet to be deposited on the next lower baking plate 20 in an inverted position with respect to its original position on the baking plate from which it is discharged. A coating of a "non-stick" organic compound, such as polytetrafluorethylene is preferably applied to the dough contacting surface of sheet 40.

When the dough disc reaches the lowermost baking plate 20, it is discharged from such baking plate by movement of the baking plate to its inclined discharge position and is dropped onto a discharge plate 44 which is of arcuate configuration and is mounted within the oven 1 by a support rod 46 which is selectively engaged with one of a plurality of notches 18a provided in opposed support bars 18. These support bars 18 are also respectively suitably secured to the bearing support frame 10, or structural panel 8a, and the front corner frame elements 3. Thus the angular inclination of discharge plate 44 may be adjusted.

As best shown in FIG. 2, the angular position of each of the inverting plates 40 may also be conveniently adjusted by a bolt 40a which is threadably engaged with a vertical frame element 3.

In the operation of the aforedescribed oven, a dough disc D is normally disposed on every other one of the baking plates 20. Thus, the output of the oven is two units for each normal period of baking time. The total baking time will vary with the nature and size of the dough disc but in the case of tortillas fabricated from flour, the total baking time is preferably about one minute, so that the residence time of the tortilla on each of the four baking discs 20 will be one fourth of the total baking time. Obviously, if increased production is required, this may be obtained by adding two more vertically spaced baking plates to the assemblage, which only increases the height of the oven but does not require any additional lateral space. The addition of two more baking plates would increase the output of the oven by a factor of fifty percent. Elimination of two baking plates would reduce output by fifty percent.

The successful operation of the heretofore described oven depends in a large degree on the utilization of gravity discharge of the dough disc from each of the baking plates 20. Such gravity discharge is greatly facilitated by applying to the baking surface of each of the baking plates 20, an organic "non-stick" coating. For example, a polytetrafluorethylene of the type sold by DuPont Company under the trademark "Teflon", when bonded to the top surface of each baking plate 20, has been found to promote the slidability of the dough disc relative to the baking plates 20. In fact, the baking plates may be inclined at a minimum angle on the order of 5–7 degrees to the horizontal and the sliding movement of the dough disc will be initiated.

Another feature of this invention is the utilization of an actuating device which is characterized by an abrupt stopping of the baking plates as the plates are pivoted to the discharge position. This is characteristic of the operation of a fluid pressure cylinder. The abrupt stopping of the movement of the baking plates to an inclined position imparts an inertia force to the dough disc tending to assist the gravity forces operating on the disc to initiate its sliding discharge movement from the particular baking plate.

Figure 7:
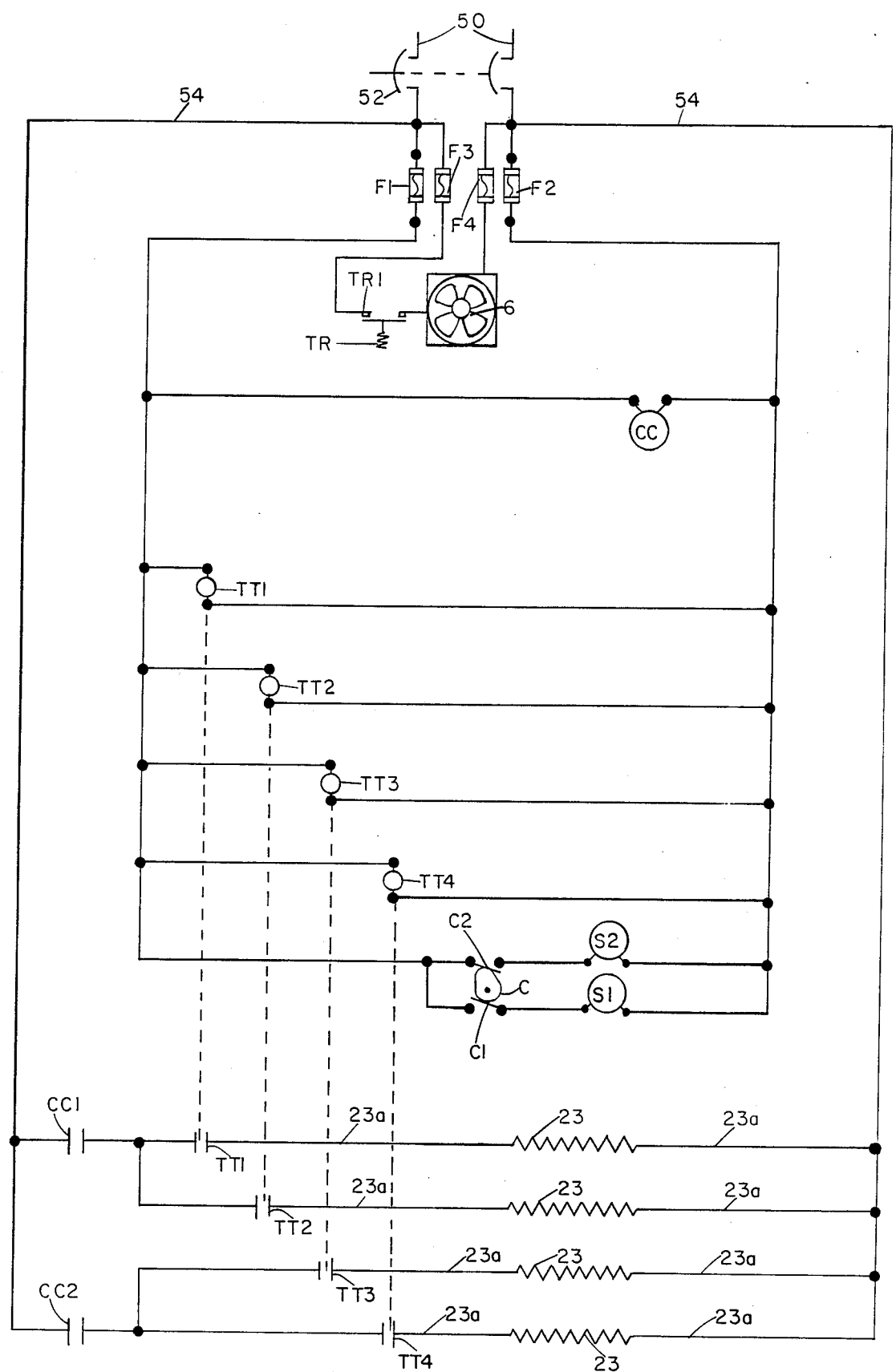
FIG. 7 is a schematic diagram of a circuit for controlling the baking apparatus of FIG. 1.

Referring now particularly to FIGS. 5 and 7, a typical control circuit for operating the oven embodying this invention will be described. From an input power source 50, a master switch 52 and electrical leads 54 apply power to each of the heating elements 23 respectively provided on the baking plates 20. Such power is not applied directly, but through the normally open contacts CC1 and CC2 of a relay CC. In addition, connected in series with each of the leads 23a leading to the heating element 23, are the contacts TT1-1, TT2-1, TT3-1 and TT4-1 of thermostatically controlled relays TT1, TT2, TT3 and TT4, which are respectively suitably mounted in proximity to each of the baking plates 20. Thus, when the master power switch 52 is closed, the coil of relay CC will be energized through fuses F1 and F4, closing the contacts CC1 and CC2. Additionally, if the temperature of the baking plate is below the range of 400°–450°, each of the thermostatic relays TT1, TT2, TT3 and TT4 will be activated through fuses F1 and F2 to close the respective contacts TT1-1, TT2-1, TT3-1 and TT4-1 and thus energize the heating elements 23 of each of the baking plates 20. From thereon, the energization of each heating plate depends on the actual temperature achieved by the respective baking plate. The thermostatic relays TT1, TT2, TT3 and TT4 are of a conventional adjustable temperature type having knobs (not shown) projecting out of the exposed face of the door 5 for convenient adjustment.

The fluid pressure activated cylinders 32 are respectively supplied with an activating fluid pressure, supplied from any conventional source (not shown), by solenoids S1 and S2. Solenoids S1 and S2 are sequentially energized by a rotating cam C which engages switches C1 and C2 in alternating sequence. Thus, only one of the energizing solenoids S1 or S2 is energized at a particular time because the contour of the rotary cam C is preferably constructed to maintain a 180° differential in the energization time of the two solenoids, hence in the activation of the two pivoting cylinders 32.

If it is desired to utilize an automatic press capable of converting balls of dough into flat discs of dough in timed sequence, then the timing switches C1 and C2 and the rotary cam C may be actually located in the dough press, thus assuring synchronization of the operation of the baking plates with that of the dough press. Hence, when a dough disc is discharged from the dough press, the timing cam C will have effected the closing of the appropriate contacts C1 or C2 to insure that the uppermost baking plate 20 is in its horizontal position.

It will also be noted that the fan 6 is energized by the closing of the main control switch 52 through fuses F3 and F4 and the contacts TR1 of a thermostatic relay TR. Thermostat TR is sensitive to the temperature within a housing 7a enclosing the control elements 7 and the purpose of the fan is to maintain a flow of air around all of the control elements 7 so as to avoid any malfunction of the control elements due to the heat generated in the adjacent oven 1. The control element housing 7a preferably has a vent in its upper end (not shown) to discharge the heated air moved through the housing by energization of the fan 6.

From the foregoing description, it will be readily apparent that this invention provides a baking oven for flat dough discs which is characterized by unusual compactness and a high productivity rate, while occupying a minimal counter space.

Although the invention has been described in terms of specified embodiments which are set forth in detail, it should be understood that this is by illustration only and the the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Apparatus for cooking flat dough discs comprising a pair of horizontally spaced, generally vertical supports; a plurality of baking plates pivotally mounted between said supports in a vertically spaced array for pivotal movement between a horizontal baking position and an inclined discharge position; means for heating each said plate to a selected baking temperature; means for concurrently shifting every other one of said plates from said baking position to said discharge position; whereby each dough disc on said every other one of baking plates is slidably discharged to the next lower baking plate; means for concurrently shifting each of said next lower baking plates from said baking position to said discharge position in alternating sequence to the shifting of said every other one of said baking plates; whereby a dough disc deposited of the uppermost baking plate is successively baked on each of said plurality of baking plates by successive progression from top to bottom of said vertically spaced array; and inverting means disposed laterally adjacent each baking plate for receiving the dough disc slidably discharged from the respective baking plate and inverting same prior to deposit on the next lower disc.

2. The apparatus of claim 1 further comprising a conveyor plate beneath the lowermost baking plate for removing the baked disc discharged from said lowermost baking plate from the oven.

3. The apparatus of claims 1 or 2 wherein both of said baking plate shifting means include means for abruptly terminating the movement of each baking plate to said inclined position, thereby producing an inertia force on the dough disc carried by each said baking plate to assist the sliding discharge movement of the dough disc off each said baking plate.

4. The apparatus of claims 1 or 2 wherein said inverting means comprises an arcuate plate adjustably mounted between each vertically adjacent pair of baking plates.

5. The apparatus of claims 1 or 2 wherein said means for concurrently shifting every other one of said baking plates comprises a link interconnecting said every other one of said baking plates; an actuator for reciprocating said link between two positions respectively corresponding to said horizontal and said discharge positions of said every other one of said baking plates; and means for periodically energizing said actuator.

6. The apparatus of claims 1 or 2 wherein said means for concurrently shifting said next lower baking plates comprises a link interconnecting said every other one of said baking plates; an actuator for reciprocating said link between two positions respectively corresponding to said horizontal and said discharge positions of said every other one of said baking plates; and means for periodically energizing said actuator.

7. The apparatus of claims 1 or 2 further comprising rigid vertical walls enclosing said baking plates to maintain a heated environment around said baking plates.

* * * * *